(No Model.)
R. H. P. ELLIS.
THILL COUPLING.
No. 299,062. Patented May 20, 1884.
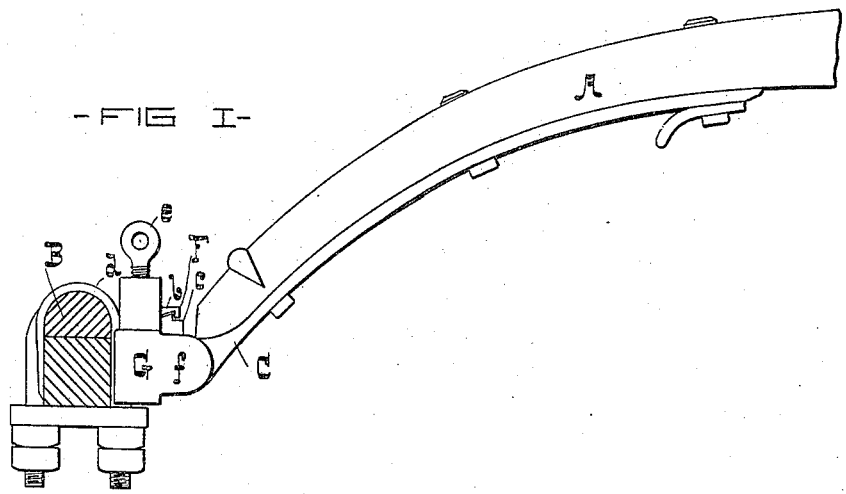
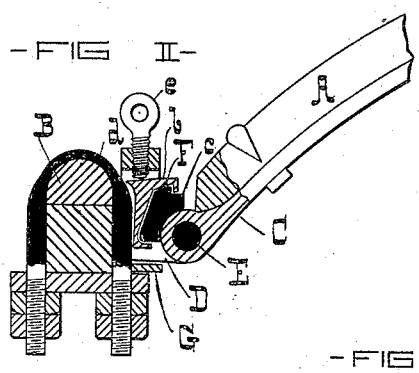
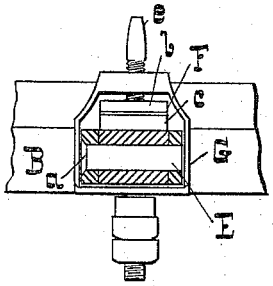
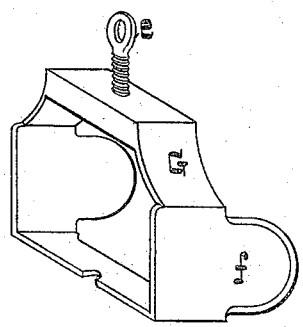

United States Patent Office.

ROBERT H. P. ELLIS, OF BALTIMORE, MARYLAND.

THILL-COUPLING.

SPECIFICATION forming part of Letters Patent No. 299,062, dated May 20, 1884.

Application filed April 1, 1884. (No model.)

*To all whom it may concern:*

Be it known that I, ROBERT H. P. ELLIS, of the city of Baltimore and State of Maryland, have invented certain Improvements in Carriage-Shaft Couplings, of which the following is a specification.

Figure I is an exterior side view of the improved coupling and a portion of one of the shafts. Fig. II is a partly sectional view of the same. Fig. III is a cross-section of Fig. II taken on the dotted line $x\,x$. Fig. IV is a perspective view, on an enlarged scale, of a part of the invention.

A is the shaft, and B the axle.

C is the portion of the coupling which is fastened to the shaft A, and D the other portion of the coupling, which is attached to the axle B. These members of the coupling are of ordinary construction, and need no further description herein.

E is the pin which unites the members C and D of the coupling, and in itself is devoid of any device—such as a nut—to keep it in place. It may consist of an ordinary cylindrical pin devoid of any head; or it may have a countersunk head, $a$, as shown in Fig. III. The rattling of the coupling is prevented by means of a wedge, F, which consists of a metallic shell, $b$, and a block of rubber, $c$, which is dovetailed therein. This wedge is inserted in the space between the staple portion $d$ of the member D of the coupling and the rounded end of the member C of the same, and is held in place by means of a clamp, G, provided with a screw, $e$, which bears on the upper surface of the shell $b$. The clamp G has side plates, $f$, which cover the ends of the pin E when the clamp G is in place.

Supposing the shaft to be attached to the axle-tree, as shown in Figs. I, II, and III, and it is desired to disconnect it, the screw $e$ is slackened, the clamp G moved from its position, and the wedge F removed. The pin E is then taken out, which disconnects the two parts of the coupling C and D and admits of the detachment of the shaft.

It will be understood that with my invention no wrench is required, as the pin E is devoid of a nut, and the only appliance required is a small rod or nail, which is inserted through the eye of the screw $e$ to turn it.

When the rubber block $c$ is slightly worn, it may be tightened by a turn of the screw $e$, and when the block is worn to such an extent as to render it inoperative it can be easily removed and a new one substituted therefor.

I claim as my invention—

In combination with the members C and D of the shaft-coupling, the removable wedge F, consisting of the metal shell $b$ and rubber block $c$, the pin E, and the clamp G, having the screw $e$ and side plates, $f$, substantially as and for the purpose specified.

ROBERT H. P. ELLIS.

Witnesses:
 CHAS. B. CASSADY,
 WM. T. HOWARD.